United States Patent

Mizobuchi

[11] Patent Number: 6,120,596
[45] Date of Patent: *Sep. 19, 2000

[54] METHOD FOR TREATING PIGMENT PARTICLES TO IMPROVE DISPERSIBILITY AND PARTICLE SIZE DISTRIBUTION

[75] Inventor: Yoshikazu Mizobuchi, Des Plaines, Ill.

[73] Assignee: Marconi Data Systems Inc., Wood Dale, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,901

[22] Filed: Jan. 23, 1997

[51] Int. Cl.[7] .............................. C08K 5/00; C09C 1/44; B05D 7/00; B32B 9/00
[52] U.S. Cl. ..................... 106/490; 106/472; 106/475; 106/493; 427/212; 427/220; 428/405
[58] Field of Search .................................... 106/490, 493, 106/472, 475; 427/212, 220; 428/405

[56] References Cited

U.S. PATENT DOCUMENTS

| | | | |
|---|---|---|---|
| 2,567,316 | 9/1951 | Bidaud | 106/287.14 |
| 2,610,167 | 9/1952 | Te Grotenhuis | 106/287.14 |
| 2,801,186 | 7/1957 | Alexander et al. | 106/490 |
| 3,333,776 | 8/1967 | Rauner et al. | 241/22 |
| 3,334,062 | 8/1967 | Brown et al. | 106/490 |
| 3,567,680 | 3/1971 | Iannicelli | 106/490 |
| 3,873,337 | 3/1975 | Laufer et al. | 106/490 |
| 3,904,787 | 9/1975 | Trebinger et al. | 106/490 |
| 3,915,735 | 10/1975 | Moreland | 106/490 |
| 4,072,796 | 2/1978 | Reinhardt et al. | 427/221 |
| 4,274,883 | 6/1981 | Lumbeck et al. | 106/490 |
| 4,503,092 | 3/1985 | Klebe et al. | 427/213 |
| 5,116,712 | 5/1992 | Nakamura et al. | 106/493 |
| 5,264,030 | 11/1993 | Tanabe et al. | 106/471 |
| 5,482,547 | 1/1996 | Bugnon et al. | 106/493 |

FOREIGN PATENT DOCUMENTS

| | | |
|---|---|---|
| 251176 | 1/1988 | European Pat. Off. . |
| 671443 | 9/1995 | European Pat. Off. . |
| 1169060 | 4/1964 | Germany . |
| 24 35 860 | 2/1976 | Germany . |
| 475106 | 8/1969 | Switzerland . |
| 1129717 | 10/1968 | United Kingdom . |
| 1154835 | 6/1969 | United Kingdom . |
| 1504977 | 3/1978 | United Kingdom . |

OTHER PUBLICATIONS

Document No. XP002062908, Publication Date Mar. 1993, Derwent, Abstract.
Document No. XP002062909, Publication Date Dec. 1989, Derwent, Abstract.
Document No. XP002062910, Publication Date Feb. 1992, Derwent, Abstract.
Document No. XP002062912, Publication Date Mar. 1992, Derwent, Abstract.
Document No. XP002062913, Publication Date Nov. 1991, Derwent Abstract.

*Primary Examiner*—Helene Klemanski
*Attorney, Agent, or Firm*—Leydig, Voit & Mayer, Ltd.

[57] ABSTRACT

Surface treated pigment particles made by contacting a dispersion of pigment particles with a halosilane or organohalosilane, elevating the temperature to form a siloxane on the surface of the particles and recovering the surface treated particles as a presscake or as dry particles.

17 Claims, No Drawings

METHOD FOR TREATING PIGMENT PARTICLES TO IMPROVE DISPERSIBILITY AND PARTICLE SIZE DISTRIBUTION

FIELD OF THE INVENTION

This invention relates generally to the field of pigments, and in particular to pigment particles that have been modified to enhance their use in various formulations, such as inks, paints, coatings and the like.

BACKGROUND OF THE INVENTION

Pigments that are used in polar environments must be readily dispersible, and must exhibit highly polar surface characteristics. The degree of polarity may extend to the degree of being hydrophilic. Accordingly, it is important for certain applications to be able to render hydrophilic or to increase the hydrophilicity of the surface of pigment particles.

It is desired to make pigments that have a small particle size distribution, are highly dispersible in many kinds of solvents including water, require little or no grinding energy and exhibit good chemical resistance. Preferably such pigments should be made by an environmentally safe procedure.

It is well known that polysiloxane materials have many useful attributes, such as surface tension energy reduction, high heat resistance, high chemical resistance, surface active properties, and dispersing ability, while being essentially nontoxic. Polysiloxanes are also useful because they exhibit good weatherability when used as coating materials and adhesives.

A U.S. Pat. No. 5,364,633 disclosed the use of modified poly(dimethylsiloxane)s, which have hydrophilic or ionic moieties on their chains, as surfactants to entrap water-soluble and water-insoluble substances. The patent uses long poly(alkyleneoxide) chains with hydroxyl moieties at the end as the hydrophilic functions. Such compounds are quite costly to design and produce.

Two Japanese published patent applications, JP4036370 and JP2218723, disclose coating inorganic pigments by using modified poly(dimethylsiloxane)s as chemically bound dispersing agents. They have functional group(s), such as amino, hydroxyl, alkoxyl or isocyanate, in one molecular terminal, and react with surface hydroxyl groups of the pigments to form a covalent bond. The surface coated pigments disperse well in non-aqueous solvent, especially silicon oil. They require severe reaction conditions and high production cost.

There are many ways to produce siloxane coated dry pigments. However many such approaches require high power grinding to minimize the particle size of the pigment because of adhesion or cross-linking between the particles.

Accordingly, a need exists for pigments that have one or more of the following properties: (1) exhibit a small particle size distribution, (2) have a high dispersibility in high polar solvents, including water, alcohols, ketones, ethers, and the like, (3) have a high dispersibility in low polar solvents, including oils and varnishes, (4) require little or no grinding energy, (5) have high chemical resistance and high color strength, and (6) can be manufactured in an environmentally safe manner.

SUMMARY OF THE INVENTION

In accordance with the present invention, surface treated pigment particles may be obtained. In each of the several embodiments of the present invention, the desired pigment particles are first suspended in an appropriate medium and then treated while in suspension, with a silane that can hydrolyze to form a siloxane. The treating is achieved by suspending the pigment in a suspension medium, using high shear mixing, and adding the silane to the suspension. The suspension is maintained with high shear mixing and is heated at an elevated temperature for a sufficient period of time to allow the silane to convert to the siloxane and to form a coating on the surface of the pigment particles. The coated particles may then be recovered by any of several techniques.

If the pigment particles are coated in an organic suspension or a mixed aqueous organic suspension, the solvent that is used to form the suspension may be removed directly by drying or may be replaced by solvent washing with a more volatile solvent that then may be removed by drying.

Similarly, if the pigment particles are coated in an aqueous suspension, the water that is used to form the suspension may be removed directly by drying or may be replaced by solvent washing with a more volatile solvent that then may be removed by drying.

The treated pigment particles may also be recovered in the form of a presscake, without forming dry, intermediate pigment particles.

Pigments, in any form, such as slurry, presscakes or dry, can be used as sources for use in the present invention. The coated pigments that result from the present invention require little or no grinding energy to be finely powdered. By way of appropriate selection of moieties attached on a silicon atom, the coated pigments may be formulated to disperse well in water as well as in high polar organic solvents. Furthermore, excellent dispersibility of the coated pigments in low polar organic solvents, vegetable oils, common drying oils, naphthenic oils and paraffinic oils is exhibited by using selected organohalosilanes that have hydrophobic moieties.

Thus, in one embodiment, the invention provides a method for preparing surface treated pigment particles, said method comprising (1) contacting a dispersion of pigment particles with a surface treating agent selected from the group consisting of halosilanes and organohalosilanes, at a temperature from about 0 to about 40° C. while maintaining the particles in dispersion with high shear stirring, (2) heating the resulting dispersion to a temperature from about 40 to about 70° C. while maintaining high shear stirring, (3) allowing the dispersion to cool to a temperature from about 15 to about 30° C., and (4) recovering the resulting surface treated particles. The surface treating agent may be added to the dispersion in an amount less than about 15% by weight of the pigment particles.

The present invention also provides a pigment dispersion comprising (a) pigment particles having on their surface a polysiloxane surface treating agent, said particle having a particle size from about 0.04 micrometer to about 2 micrometer, and (b) a vehicle. The vehicle may be one or more solvents selected from the group consisting of ketones, alcohols, alkanols, water, ethers, glycols, low polar organic solvents and non-polar organic solvents.

DESCRIPTION OF THE PREFERRED EMBODIMENTS

Typically, the coating of the pigments is carried out by the reaction of halosilanes with water The reaction is completed by an interfacial polymerization because of incompatibility of the silanes to water. The coating is carried out by Van der Waals attraction between the resulting siloxane and the surface of the pigment. It is believed that there is no covalent bonding that occurs between the surface of the pigment particle and the resulting siloxane formed from the halosilane.

The coated pigments that are made in accordance with the present invention are useful in paints, thermal ink ribbons, dry jet inks (solid ink for ink jet), ink jet inks (liquid ink), oil based inks, solvent based inks, water-based inks, thermally curable inks (by dehydration of silanol groups above 200° C.), presscakes for all types of inks, toner for xerography, coloring material for fabrics, coloring material for thermoplastics, display panels.

The chemistry behind the use of the water reactive halosilanes in the present invention is shown below:

1) Monohalosilane

$2\ R^1R^2R^3SiCl+H_2O \rightarrow R^1R^2R^3SiOSiR^3R^2R^1+2\ HCl$

2) Dihalosilane

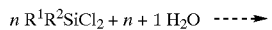
$n\ R^1R^2SiCl_2 + n + 1\ H_2O \longrightarrow$

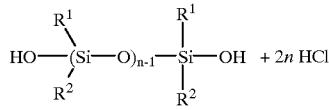

or

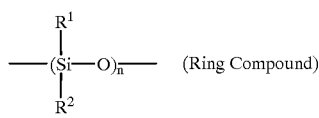
(Ring Compound)

3) Trihalosilane

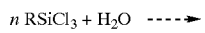
$n\ RSiCl_3 + H_2O \longrightarrow$

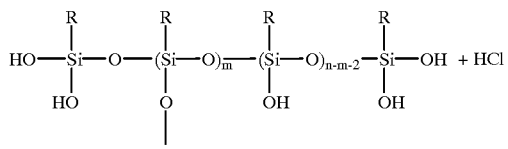

4) Tetrahalosilane

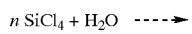
$n\ SiCl_4 + H_2O \longrightarrow$

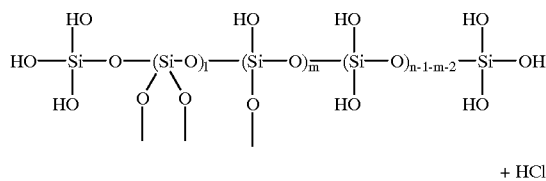
+ HCl

R, $R^1$, $R^2$, $R^3$: Any kind of moiety which does not involve heteroatoms. Two or three aromatic rings or moieties larger than those should not be involved in the monohalo and dihalo silanes.

5) Titanium tetrachloride

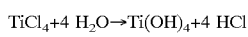
$TiCl_4 + 4\ H_2O \rightarrow Ti(OH)_4 + 4\ HCl$

Even if organic solvents are used to purify the pigments, the interfacial reaction occurs the same as if conducted in water because the organic solvent-treated pigments maintain a water layer on their surface. High shear mixing, with heat, is required to coat the pigment effectively.

The coating mechanism is successful because of the relative affinities among siloxane, water (optionally with organic solvents) and the pigment surface. Since the siloxane has poor compatibility with water, it deposits on the surface of the pigments and the water prevents the agglomeration of the coated pigments. After drying, as with air drying at room temperature or 40 degrees C., the coated pigments separate easily.

Pigments

The pigments that are of use in the present invention include but are not limited to the following:

Metallized Azo Reds: Red 49:1 (Barium salt), Red 49:2 (Calcium salt), Red 63:1 (Calcium salt)

Toluidine reds

Naphthol reds

Pyrazolones

Rhodamines

Quiacridones: Red B, Red Y, Magenta B, Magenta and violet

Phthalocyanine blues, including copper phthalocyanine blue

Alkali Blue

Phthalocyanine greens

Carbazole violets

Monoarylide Yellow

Diarylide Yellow

Red Lake C

Lithol reds: calcium and barium salts

Lithol rubine

Bon Maroon

Perylene pigments

Red 2B: Calcium, Barium and Magnesium salts

Chrome Yellow

Chrome Orange

Molybdate orange

Orange 36, Diarylide orange, Dianisidine orange, tolyl orange and Dinitraniline orange Carbon black, titanium dioxide, and iron compounds Such pigments may have a wide range of particle sizes, as from about 0.02 micrometer to about 100 micrometer, preferably from about 0.04 micrometer to about 5 micrometer, and more preferably from 0.04 micrometer to 2 micrometer. Some of the commercially available pigments in dry form and in presscake form are resinated during the manufacturing processes, for example lithol rubine, to increase color strength and to control its particle size.

The present invention is applicable to both organic pigments and inorganic pigments and to carbon black.

Coating

The coating may be formed by use of any of the silanes discussed above, which react to form siloxanes on the surface of the particles. Additionally, titanium tetrachloride may be used to modify the pigment particle surface.

The Organic Media

Any of a wide variety of organic media may be used for purposes of the present invention. An organic solvent may be used alone or in combination with water, depending upon the pigment condition before the surface treatment is carried out, such as slurry form in water, presscake form or dry form. The coating environment of the pigments started from a slurry (water) or presscake is a mixture of organic solvent (s) and water.

The Washing Solvent

Organic solvents that have relatively low boiling points around 100° C. or less are typically used as the solvent for washing. Such solvents include n-propanol or ethanol.

Area of Application

The present invention is useful for making coated pigment particles that may find use in a wide variety of applications, such as ink for ink jet (continuous and drop-on-demand system), dry jet ink (solid ink for ink jet), thermal ink ribbon, oil based ink, solvent based ink, water based ink, water based paint and coatings, presscake for inks, toner for xerography, coloring material for fabrics, coloring material for plastics and display panels, and the like.

EXAMPLES

The present invention is further illustrated by the following non-limiting examples.

For the examples, the following equipment, reagents and procedures were used, unless otherwise specified.

Process Equipment

A 1.2 L stainless steel container equipped with a disperser from Premier Mill Corp., Laboratory Dispersator, Series 2000, Model 90 (one horse power with a 2.5 inch blades) and a hot plate was used for all processes.

A mixer from Charles Ross and Son Company, Model LDM-1QT, equipped with a heater and a vacuum pump was used for preparing ink concentrates from dry coated pigments with varnish as well as from coated pigment in presscake form by flushing water with the varnish.

Particle Size Distribution Analysis

A laser beam scattering particle size analyzer from HORIBA, Model LA-900 (range of particle size detection: 0.04 micrometer to 1000 micrometer), was used for the particle size distribution study on the surface treated pigments (in dry form and in presscake form) which were redispersed in a solvent. Ethanol was chosen as the solvent for the particle size analysis in the analyzer. Relative refractive indexes for the measurements were set at 1.41 for carbon black, copper phthalocyanine blue, lithol rubine, diarylid yellow and alkali blue (refractive index of carbon black: 1.92/refractive index of ethanol: 1.36) because of difficulty in getting the refractive index for the pigments, and at 1.84 for titanium dioxide (refractive index of titanium dioxide: 2.50/refractive index of ethanol: 1.36).

Pigments for Surface Treatment

Three presscakes, Copper Phthalocyanine Blue G/S (BL2101-PC), Lithol Rubine (LR5133-PC) and Diarylid Yellow (YA1933-PC) from Magruder Color Co. Inc., were used, as indicated in the examples A presscake, Alkali Blue (NB D6152), from BASF, was also used as indicated in the examples.

Carbon Black, Elftex-8 in dry form from Cabot Corporation, Special Black Division and AJACK BLACK 5021, which was a pre-ground carbon black slurry, from Dispersion Solution Inc. were also used as indicated in the examples. Titanium dioxide in dry form from Nanophase was also used as indicated in the examples.

Surface Coating Agents and Solvents

Monoalkyltrichlorosilanes and dialkyldichlorosilanes were from Gelest, Inc. All other surface coating agents and all solvents were from Aldrich Chemical Company.

Surface Coating Procedures

1. Treatment in Water

A slurry (10 wt. % pigment) was reconstituted from a presscake (36 grams of pigment in dry weight) with water in the container. It was mixed well with the disperser at app. 1000 rpm for 20 min. A halosilane was added to the slurry slowly at high speed dispersing condition between 2000 rpm and 3000 rpm. After the addition of the silane the mixture was heated up to about 60 degrees C. with keeping the high speed dispersing condition at 3000 rpm for 30 min. Then the hot plate was removed from the reaction set and the mixture was cooled off by air with mixing at 2000 rpm.

The surface treated pigment slurry was split by two and put in two 1 quart jars. About 200 grams of ethanol was added to the slurry in the jar and they were shaken by hands. After the treated pigments settled, the supernatant was decanted and the slurry was air-dried on watch glasses for overnight to 3 days. The addition of ethanol caused elimination of a certain amount of water from the slurry and accelerated the evaporation speed of water from it.

The dried surface treated pigments were broken off by using a spatula in a 8 oz glass jar and redispersed in solvent(s) with sonication for 5 to 10 minutes to test their stability in solvent(s) and their particle size distributions.

2. Treatment in a Mixture of Organic Solvent and Water

This is a method that allows for the purification of pigments in a slurry with impurities, such as salts, unreacted starting materials for the pigment production and organic materials. A slurry which contained 10 wt. % of pigment in water was reconstituted from a presscake in the container by stirring at 1000 rpm for 20 min. Xylene which is ⅙ of total water in the slurry was added slowly with stirring at 500 rpm. The phase separation was observed after about 5 min. The pigment was transferred to the xylene rich phase with a certain amount of water. A typical ratio of the ingredients in the xylene base paste is shown in Table 1.

TABLE 1

Percentage of Ingredients in Xylene Paste

| Ingredients | Weight Percent |
| --- | --- |
| Copper Phthalocyanine Blue Pigment | 27.6 |
| Xylene | 41.8 |
| Water | 30.6 |
| Total | 100.0 |

The xylene paste which involved 36 grams of the pigment in dry weight was dispersed in 316 grams of xylene in the container with the disperser at 1000 rpm for 20 min. Then a halosilane was added slowly at room temperature in the high shear dispersing condition between 2000 rpm and 3000 rpm. After the addition of the silane compound the mixture was kept at 60 degrees C. for 30 minutes at 3000 rpm. The heater was removed from the reaction set and the mixture was cooled in air at 2000 rpm.

The mixture then was treated as mentioned above in the section of "1. Treatment in Water" and the siloxane coated dry pigment was prepared.

3. Dry Pigments

Dry pigments, such as carbon black, were dispersed in water with high shear dispersing condition at 1500 rpm to 2000 rpm for 30 minutes with heat around 60° C. to prepare the 15 wt. % pigment loaded slurry. Then it was cool down to the room temperature with mixing at the same speed.

The further surface treatments in the water or in the mixture of the organic solvent(s) and water, and the preparation of the siloxane coated dry pigment is shown above in both sections of "1. Treatment in water" and "2. Treatment in a mixture of organic solvent(s) and water".

Preparation of Pigment Dispersion

Approximately 1 wt. % pigment loaded dispersion was prepared in a 20 mL glass vial. It was sonicated for 20 minutes. Solvents for the pigment dispersions were water, ethanol, methylethylketone(MEK), toluene and soy oil.

Testing Procedure of Stability of Pigment Dispersion

After preparation, as described above, the dispersions were kept still on an experimental bench for 24 hours and the stability of the pigment dispersions was evaluated by observing the amount of settled pigment and the color of the supernatants. The dispersions were classified by four degrees of stability, as shown in Table 2.

TABLE 2

Explanation of Degree of Pigment Dispersion Stability

| Degree of Stability | Explanation |
| --- | --- |
| E | Suspended very well with no settling |
| G | Suspended well with a little settling |
| P | Poorly suspended with a large settling |
| VP | Totally settled |

Preparation of Presscake Made From Coated Pigment

Presscakes were prepared by filtration of the coated pigments in water-based slurries.

Evaluation of Water Content in Presscake

About 2 grams of the presscake was weighed in an aluminum cup and was set in a drying oven at 110° C. for 18 hours to 24 hours. The water content was calculated from its weight loss.

Evaluation of Pigment for Chemical Resistance

The coated dry pigment was mixed with an acid fountain solution (pH: 4.64) and an alkaline fountain solution (pH: 9.98) individually in 20 ml glass vials to constitute about 1 weight percent dispersions. They were sonicated for a few minutes and kept still at room temperature for 24 hours. The color of the supernatants then was evaluated as being the chemical resistance. A stronger color showed poor chemical indicative of resistance, as being directly related to "bleeding" of an ink caused by a fountain solution during a printing process. This is important test for ionic pigments, such as Lithol Rubine and Alkali Blue.

Evaluation of Pigment in Oil Based Ink

The coated dry copper phthalocyanine blue pigment was mixed by hand with a varnish as shown in Table 3, at a ratio of 40/59 (pigment/varnish), by weight, to make an ink concentrate. The mixture was set in a mixer from Charles Ross and Son Company, Model LDM-1QT, equipped with a heater and mixed at 70.28 rpm for 30 minutes at 40° C. After the ink concentrate was allowed to cool, at room temperature, one part of an anti-oxidant (10 weight percent of BHT in Aged Linseed Oil) was added and mixed at the same speed for 10 minutes.

TABLE 3

Ingredients of Varnish*

| Ingredients | Weight Percent |
| --- | --- |
| Aged Linseed Oil | 71.43 |
| Pentrex 859HV from Harcules | 22.86 |
| Acryloid-R DM-55 from Rhom and Haas | 5.71 |
| Total | 100.00 |

*: The varnish was prepared in nitrogen atmosphere.

The ink concentrate was mixed by hand with a heat set let-down varnish as shown in Table 4 a ratio of 42/58 (ink concentrate/varnish), by weight, to prepare a heat set ink. The ink was mulled 200 revolutions with a 10 LB weight by using a Hoover Automatic Muller Model M5 from Hoover Muller Color Corporation.

TABLE 4

Formulation of Heat Set Let-down Varnish

| Ingredients | Weight Percent |
| --- | --- |
| Exoset HS-126-G* | 65.5 |
| Exoset Q.S. 128 FF* | 10.3 |
| Capsule Softening Vehicle NVFG-380* | 5.2 |
| Poly/PTFE Compound from Lawter International Inc. | 5.2 |
| Exoset FF Varnish X-200-82A* | 12.1 |
| COVI-OX T-70 from Henkel Corp. | 1.7 |
| Total | 100.0 |

*: From Walsh Manufacturing Company.

An off-set color swatching press from Little Joe Color Swatcher Inc., was employed for printing inks on sheets of coated stock paper. They were heatset at 250° F. by using a heater from SQG Industries. Five samples were prepared for each ink.

The color quality of the inks, such as L, a and b values, was measured by using a spectrophotometer from Hunter Lab, Model 45/0 Color Quest. The gloss of the printed ink was evaluated by using a gloss meter from Hunter Lab (ProGloss) at 60 degree. A densitometer from Macbeth, Model RD918, was employed to measure the density of the samples. All data were the average of the five printed samples.

A Laray viscometer was employed for the Theological analysis of the heatset inks, such as Viscosity, Yield Value and Shortness Factor.

Examples 1–4

Dimethyldichlorosilane Treated Copper Phthalocyanine Blue in Mixture of Xylene and Water Based on Procedure #2

This experiment was conducted to determine the optimum concentration of dimethyldichlorosilane when used in the mixed solvent system to deposit siloxane on the surface of the pigment. Table 5 shows the stability of the resulting coated pigments as dispersions in five different solvents, water, ethanol, methylethylketone (MEK), toluene and soy oil.

TABLE 5

Stability of Dispersion
Optimization of Loading Surface Treating Material on Pigment

| Example No. | Dimethyl-dichlorosilane (wt. %) | Water | Ethanol | MEK | Toluene | Soy Oil |
|---|---|---|---|---|---|---|
|   | 0  | P  | VP | VP | P | G |
| 1 | 3  | G  | E  | E  | G | G |
| 2 | 5  | G  | E  | VP | G | G |
| 3 | 10 | G  | G  | VP | P | G |
| 4 | 20 | VP | E  | E  | P | G |

From the foregoing, it appears that the nontreated (0 wt. %) pigment is unstable in all of the solvents except soy oil. On the other hand, the surface treated pigments are quite stable in most of the solvents with some exceptions, such as the 20 wt. % treated pigment in water and in toluene. Generally, the treatment provided increased hydrophilicity, or polarity, while maintaining some compatibility to toluene. The resultant pigments also had good compatibility to soy oil.

Another important issue with respect to the surface treated pigments are the particle size distribution in dispersions. Table 6 shows the results of the particle size distributions as a function of the concentration of dimethyldichlorosilane used to apply a polysiloxane coating on the pigment surface.

TABLE 6

Particle Size Distribution
Optimization of Loading Surface Treating Materials on Pigment

| Example No. | Dimethyl-dichlorosilane (wt. %) | Median Diameter (micrometer) | Standard Deviation (micrometer) |
|---|---|---|---|
|   | 0  | 0.205 | 1.738 |
| 1 | 3  | 0.201 | 0.095 |
| 2 | 5  | 0.178 | 0.028 |
| 3 | 10 | 0.174 | 0.044 |
| 4 | 20 | 0.178 | 0.030 |

From the foregoing results, it appears that the nontreated pigment has a large standard deviation compared with the treated pigments. The optimum condition appears to have resulted from the use of 5 wt. % of the dimethyldichlorosilane.

Examples 5–6

Dimethyldichlorosilane Treated Copper Phthalocyanine Blue in Water, and Mixture of Xylene and Water Based on the Procedures #1 and #2

Because water is a desirable medium, from an environmental viewpoint, it was tested in comparison with the mixed media approach of xylene and water for the surface treatment, using dimethyldichiorosilane as the coating agent. The results are shown in Table 7.

TABLE 7

Stability of Dispersion
Dependency of processing environments
Si: Dimethyldichlorosilane

| Example No. | Si (wt. %) | Processing Environment | Water | Ethanol | MEK | Toluene | Soy Oil |
|---|---|---|---|---|---|---|---|
| 5 | 5 | Water | VP | E | VP | P | G |
| 6 | 5 | Xylene & Water | G | E | VP | G | G |
|   | 0 |   | P | VP | VP | P | G |

It appears that the surface treated pigment made in water lost stability as a dispersion in water and in toluene; however it demonstrated good compatibility in ethanol and soy oil, showing the effectiveness of the surface treatment. Its utility in affecting particle size distribution is shown in Table 8.

TABLE 8

Particle Size Distribution
Dependency of Processing Environment
Si: Dimethyldichlorosilane

| Example No. | Si (wt. %) | Processing Environment | Median Diameter (micrometer) | Standard Deviation (micrometer) |
|---|---|---|---|---|
| 5 | 5 | Water | 0.104 | 0.078 |
| 6 | 5 | Xylene & Water | 0.178 | 0.028 |
|   | 0* |   | 0.205 | 1.738 |

*: Control, It was prepared from the presscake by air-drying at room temperature overnight or 3 days.

The surface treatment in water accomplished coating the pigment with siloxane and also made its particle size much smaller than the untreated particle or that treated in the mixed solvent.

Examples 7–9

Dialkyldichlorosilane Treated Copper Phthalocyanine Blue in a Mixture of Xylene and Water, Based on Procedure #2

These examples demonstrate that by using haloalkylsilanes with alkyl groups of varying chain lengths it is possible to modify the hydrophilic to hydrophobic properties of the coated particle. As an indication of the varying hydrophilic/hydrophobic characteristics, the treated pigments are dispersed in solvents with different hydrophilic/hydrophobic characteristics, and the stability of the resultant suspensions are observed. The results are shown in Table 9.

TABLE 9

Stability of Dispersion
Surface Character Control
Surface Treating Material: Dialkyldichlorosilane

| Example No. | Dialkyl Groups (wt. %) | water | Ethanol | MEK | Toluene | Soy Oil |
|---|---|---|---|---|---|---|
| 7 | Dimethyl (5 wt. %) | G | E | VP | G | G |
| 8 | Propyl methyl (5 wt. %) | G | E | E | G | G |

TABLE 9-continued

Stability of Dispersion
Surface Character Control
Surface Treating Material: Dialkyldichlorosilane

| Example No. | Dialkyl Groups (wt. %) | water | Ethanol | MEK | Toluene | Soy Oil |
|---|---|---|---|---|---|---|
| 9 | Octa decyl methyl (13 wt. %) | VP | G | VP | E | G |

The loading percentages were approximately adjusted by the molecular weight of the silanes.

From the foregoing, it is clear that the longer alkyl chain such as octadecyl group showed high compatibility to toluene and poor compatibility to water. The propylmethyldichlorosilane treated pigment showed good compatibility to the all solvents.

Table 10 shows the particle size distributions for those products.

TABLE 10

Particle Size Distribution
Surface Character Control
Surface Treating Material: Dialkyldichlorosilane

| Example No. | Dialkyl Groups (wt. %) | Median Diameter (micrometer) | Standard Deviation (micrometer) |
|---|---|---|---|
| 7 | Dimethyl (5 wt. %) | 0.178 | 0.028 |
| 8 | Propylmethyl (5 wt. %) | 0.189 | 0.175 |
| 9 | Octadecylmethyl (13 wt. %) | 0.184 | 1.024 |

Increasing the length of the alkyl group was a negative factor from the standpoint of particle size distribution, as it was found that increasing the chain length to such a degree also increased the Standard Deviation. However, the stability of the pigment dispersion, as shown in the prior Table, appears to be related to the surface characteristics of the siloxane that results from the haloalkylsilane.

Examples 10–12

Monoalkyltrichlorosilane Treated Copper Phthalocyanine Blue Made in a Mixture of Xylene and Water Based on Procedure #2

These Examples were conducted to determine the viability of monoalkyltrichlorosilane in the process and the dependency of the surface characteristic change on the particle in relationship to the length of the alkyl group on the silane.

Table 11 shows the dependency clearly with the long-chain alkyl groups enhancing stability in nonpolar solvents and decreasing stability in polar solvents.

TABLE 11

Stability of Dispersion
Monoalkyltrichlorosilane

| Example No. | Alkyl Group (wt. %) | Water | Ethanol | MEK | Toluene | Soy Oil |
|---|---|---|---|---|---|---|
| 10 | Methyl (5 wt. %) | E | E | VP | G | G |
| 11 | Octyl (8.2 wt. %) | G | G | E | G | G |
| 12 | Octa decyl (12.2 wt. %) | VP | VP | VP | G | G |

The weight percentage of coating materials on the pigment vary depending upon their respective molecular weights.

The foregoing results demonstrate that the surface treatments were successful when monoalkyltrichlorosilanes were used as the treating agent, and hydrophobicity was increased by using longer alkyl groups in the coating materials.

The particle size distributions of the coated particles are shown in Table 12.

TABLE 12

Particle Size Distribution
Monoalkyltrichlorosilanes

| Example No. | Alkyl Group (wt. %) | Median Diameter (micrometer) | Standard Deviation (micrometer) |
|---|---|---|---|
| 10 | Methyl (5 wt. %) | 0.142 | 0.205 |
| 11 | Octyl (8.2 wt. %) | 0.151 | 0.112 |
| 12 | Octadecyl (12.2 wt. %) | 0.450 | 0.640 |

It appears that the trichlorosilanes were not as effective in improving the standard deviation of the pigment as the dichlorosilanes.

Example 13

Trialkylmonochlorosilane Treated Copper Phthalocyanine Blue Made in a Mixture of Xylene and Water Based on Procedure #2

To demonstrate that polymerization was not the key to change the surface character of the pigment, one trialkylmonochlorosilane was chosen for use in the process because such a silane does not polymerize. Table 13 shows the dispersibility of the resulting surface treated pigment.

TABLE 13

Stability of Dispersion
Trialkylmonochlorosilane

| Example No. | Trialkyl Group (wt. %) | Water | Ethanol | MEK | Toluene | Soy Oil |
|---|---|---|---|---|---|---|
| 13 | Triethyl (5.8 wt. %) | VP | E | VP | P | G |

As shown in the Table, the treatment increased the stability of the pigment in ethanol in comparison with nontreated (0 wt. %) pigment, as shown in Table 5. Furthermore the particle size distribution of the treated pigment was superior to that of the nontreated pigment as shown in Table 14 and Table 6.

TABLE 14

Particle Size Distribution
Triaklylmonochlorosilane

| Example No. | Trialkyl Group (wt. %) | Median Diameter (micrometer) | Standard Deviation (micrometer) |
|---|---|---|---|
| 13 | Triethyl (5.8 wt. %) | 0.154 | 0.088 |

It appears that it is not required that the coating material result in the formation of a polymer on the surface of the pigment particle. Evidently, the formation of a dimer, such as thriethylsiloxy triethylsilane is sufficient to suspend the pigment in ethanol with good particle size distribution.

Examples 14–16

Monoalkyltrichlorosilane Treated Copper Phthalocyanine Blue Made in Water, and Mixture of Xylene and Water Based on Procedures #1 and #2

Table 15 shows the availability of water as a solvent for processing methyltrichlorosilane on the pigment.

TABLE 15

Stability of Dispersion
Dependency of Processing Environments
Si: Methyltrichlorosilane

| Example No. | Si (wt. %) | Processing Environment | Water | Ethanol | MEK | Toluene | Soy Oil |
|---|---|---|---|---|---|---|---|
| 14 | 5 | Xylene & Water | VP | E | VP | G | G |
| 15 | 5 | Water | G | G | VP | E | G |
| 16 | 10 | Water | G | G | VP | P | G |
|  | 0* |  | P | VP | VP | P | G |

*:Control, prepared from the presscake by air-drying overnight to 3 days.

From the foregoing it appears that the surface treated pigment, using 5 wt. % of methyltrichlorosilane in water, demonstrated the highest general improvement in the stability of the dispersions in the four samples. Higher coating material loading showed better stability in water but poorer compatibility to toluene. The particle size distributions for the products are shown in Table 16.

TABLE 16

Particle Size Distribution
Dependency of Processing Environment
Si: Methyltrichlorosilane

| Example No. | Si (wt. %) | Processing Environment | Median Diameter (micrometer) | Standard Deviation (micrometer) |
|---|---|---|---|---|
| 14 | 5 | Xylene & Water | 0.142 | 0.205 |
| 15 | 5 | Water | 0.101 | 0.085 |
| 16 | 10 | Water | 0.210 | 0.898 |
|  | 0* |  | 0.205 | 1.738 |

*: Control, See Table 15.

Apparently, the higher the loading of the silane, the higher the standard deviation, probably due to three dimensional high reactivity in water. The optimum concentration appears to be about 5 wt. % to keep the particle size small while maintaining general utility for various solvent dispersions.

Example 17–18

Tetrachlorocompound Treated Copper Phthalocyanine Blue Made in Water, Based on Procedures #1

It is assumed that the stability of the pigment in water is based on the population of the hydroxyl group in the coating material on the pigment surface, besides small particle size. Therefore the tetrafunctional-silane (tetrachlorosilane) and tetrafunctional-titanium (titanium tetrachloride) were selected for this evaluation to prove the assumption. The treatments were completed in water. Table 17 shows the stability of dispersions made from the surface treated pigments.

TABLE 17

Stability of Dispersion
Tetrachlorocompounds in Water
Si: Tetrachlorosilane Ti: Titanium Tetrachloride

| Example No. | Tetrachloro compound (wt. %) | Water | Ethanol | MEK | Toluene | Soy Oil |
|---|---|---|---|---|---|---|
| 17 | Si (6.5 wt. %) | E | E | VP | p | G |
| 18 | Ti (7.2 wt. %) | E | E | VP | P | G |

It is clear that these treatment increased the stability of the pigment as a dispersion in water and in ethanol. On the other hand, the treated pigments were less stable in toluene.

It is important to emphasize that titanium tetrachloride does not polymerize with water; thus, it functions by the deposition of titanium tetrahydroxide on the pigment. This data strongly supports the theory that increasing the hydroxyl group density in the coating material results in improved suspension of the pigment in water or ethanol. Table 18 shows the particle size distributions for the products.

TABLE 18

Particle Size Distribution
Tetrachlorocompounds in water
Si: Tetrachlorosilane Ti: Titanium Tetrachloride

| Example No. | Tetrachloro Compounds (wt. %) | Median Diameter (micrometer) | Standard Deviation (micrometer) |
|---|---|---|---|
| 17 | Si (6.5 wt. %) | 0.128 | 0.072 |
| 18 | Ti (7.2 wt. %) | 0.116 | 0.062 |

These treatments resulted in pigment particle sizes that were quite small, with small standard deviations.

Examples 19–20

Poly(dimethylsiloxane) Treated Copper Phthalocyanine Blue in Water Based on Procedures #1

To determine if a polysiloxane that is not formed in situ is also useful in modifying the surface characteristics of pigment particles, poly(dimethylsiloxane) from Dow Corning, 0.65 centistokes, was applied to pigment surfaces while suspended in water. The pigments so treated were compared to pigments treated by the interfacially polymerized siloxanes. Table 19 describes the differences.

TABLE 19

Stability of Dispersion
Poly (dimethylsiloxane), 0.65 centistokes, in Water
Poly Si: Poly(dimethylsiloxane) Si: Dimethyldichlorosilane

| Example No. | Coating Material (wt. %) | Water | Ethanol | MEK | Toluene | Soy Oil |
|---|---|---|---|---|---|---|
| 19 | Poly Si (5 wt. %) | G | VP | VP | VP | G |
| 20 | Si (5 wt. %) | VP | E | VP | P | G |

It appears that the pigments treated with the preformed polysiloxane exhibit different characteristics than those treated with haloalkylsilanes to form polysiloxanes in situ. It is clear, however, that the commercially available polysiloxane is a good surface coating material for the pigments. Table 20 demonstrates the improvement in pigment particle size distribution achieved by both approaches.

TABLE 20

Particle Size Distribution
Poly(dimethylsiloxane), 0.65 centistokes, in water
Poly Si: Poly(dimethylsiloxane) Si: Dimethyldichlorosilane

| Example No. | Coating Materials (wt. %) | Median Diameter (micrometer) | Standard Deviation (micrometer) |
|---|---|---|---|
| 19 | Poly Si (5 wt. %) | 0.174 | 0.796 |
| 20 | Si (5 wt. %) | 0.104 | 0.078 |

The dimethyldichlorosilane treated pigment has a much smaller particle size and low standard deviation compared with the poly(dimethylsiloxane) treated pigment; however, the poly(dimethyl)siloxane does function to improve the surface coating on the pigment.

Example 21

Dialkyldichlorosilane Treated Lithol Rubine Made in Water Based on Procedure #1

In this Example the coating process is applied to Lithol Rubine pigment, in water. The pigment is a quite hydrophilic material. Table 21 shows the stability of the treated pigment in dispersions of various solvents.

TABLE 21

Stability of Dispersion
Dimethyldichlorosilane treated Lithol Rubine in water

| Example No. | Silane (wt. %) | Water | Ethanol | MEK | Toluene | Soy Oil |
|---|---|---|---|---|---|---|
| 21 | 5 | G | VP | E | P | G |
|  | 0* | P | VP | VP | P | G |

*: Control, prepared from the presscake by air-drying overnight or 3 days.

The treatment increased the stability of the pigment in water and MEK, in comparison to the untreated pigment. Table 22 shows the particle size distribution for the treated pigment.

TABLE 22

Particle Size Distribution
Dimethyldichlorosilane treated Lithol Rubine in water

| Example No. | Silane (wt. %) | Median Diameter (micrometer) | Standard Deviation (micrometer) |
|---|---|---|---|
| 21 | 5 | 0.140 | 0.212 |
|  | 0* | 0.949 | 2.636 |

*: Control, See Table 21.

It is clear that the treatment minimized the particle size distribution, even though the pigments exhibited some disadvantage, such as poor stability in ethanol.

Examples 22–23

Dialkyldichlorosilane Treated Diarylid Yellow Pigment Made in Water, Based on Procedure #1

In this Example the coating process is applied to Diarylid Yellow pigment, which also inherently has some degree of hydrophilicity. Table 23 shows the stability of the treated pigments in various dispersions.

TABLE 23

Stability of Dispersion
Dimethyldichlorosilane treated Diarylid Yellow pigment in water

| Example No. | Silane (wt. %) | Water | Ethanol | MEK | Toluene | Soy Oil |
|---|---|---|---|---|---|---|
| 22 | 5 | VP | VF | VF | VF | G |
| 23 | 5 in pH 1.8* | P | VP | P | VP | E |
|  | 0** | P | VP | VP | VP | P |

*: The coating process was controlled at pH 1.8.
**: Control, See Table 21.

Although it is difficult to modify the surface of the yellow pigment, the present treatment provided improved dispersibility of the pigment in soy oil, when compared to the nontreated (0 wt. %) pigment. Table 24 shows the surface treated pigments particle size distributions.

TABLE 24

Particle Size Distribution
Dimethyldichlorosilane treated Diarylid Yellow pigment in water

| Example No. | Silane (wt. %) | Median Diameter (micrometer) | Standard Deviation (micrometer) |
|---|---|---|---|
| 22 | 5 | 0.871 | 0.348 |
| 23 | 5 in pH 1.8* | 0.787 | 0.284 |
|  | 0** | 5.712 | 3.435 |

*: See Table 23.
**: See Table 21.

Although the treated pigment had particle sizes that were relatively large, there was an improvement in the dispersibility of the yellow pigment in soy oil. The use of ethanol as a medium to evaluate the particle size did not provide good results because all of the pigments have very poor stability in ethanol. However, the difference in particle size distribution between the surface treated pigments and the control was still clear.

Example 24

Dialkyldichlorosilane Treated Carbon Black Made in Water, Based on Procedure #3

This Example demonstrates the applicability of the process for coating carbon black pigment in water. The chosen carbon black has some degree of hydrophilicity. Table 25 shows the stability of the treated pigment in various dispersions.

TABLE 25

Stability of Dispersion
Dimethyldichlorosilane treated Carbon Black in water

| Example No. | Silane (wt. %) | Water | Ethanol | MEK | Toluene | Soy Oil |
|---|---|---|---|---|---|---|
| 24 | 5 | G | E | G | P | G |
|  | 0* | VP | E | G | VP | G |

*: Control, Nontreated dry pigment.

A significant difference between the treated and nontreated pigments is the stability in water, due to increased hydrophilicity of the pigments. Table 26 shows the particle size distributions of the treated and untreated pigments.

TABLE 26

Particle Size Distribution
Dimethyldichlorosilane treated Carbon Black in water

| Example No. | Silane (wt. %) | Median Diameter (micrometer) | Standard Deviation (micrometer) |
|---|---|---|---|
| 24 | 5 | 0.323 | 0.313 |
|  | 0* | 0.238 | 0.068 |

*: Control, See Table 25.

Although the surface treatment did not reduce the particle size distribution of the treated carbon black pigment, the treatment did result in increased hydrophilicity on the pigment surface.

Examples 25–27 the Section of Surface Treatment Procedures, #1

The purpose of these Examples is to determine the effect of the surface treatment of the present invention on Alkali Blue, which is a pigment that has good hydrophilicity and has ionic moieties in its chemical structure. It has excellent dispersibility in ethanol without any treatment and is predictably difficult to disperse in vegetable oils and low polar solvents. Additionally, it exhibits a bleeding problem has been observed, when mixed with an acidic fountain solution. The pigment also has quite poor stability in alkaline fountain solution. Table 27 shows the stability of the Alkali Blue pigment treated in accordance with the present invention, when dispersed in various solvents and in fountain solutions.

TABLE 27

Stability of Dispersion
Dimethyldichlorosilane treated Alkali Blue made in water

| Ex. No. | Silane (wt. %) | Water | EtOH | MEK | Toluene | Soy Oil | Acid F. pH 4.64 | F. pH 9.98 |
|---|---|---|---|---|---|---|---|---|
| 25 | 5 | VP | E | P | G | E | Light Bleeding | Reacted |
| 26 | 7 | VP | E | P | G | G | No Bleeding | Reacted |
| 27 | 20 | VP | E | G | E | G | No Bleeding | Reacted |
|  | 0* | VP | E | P | VP | P | Heavy Bleeding | Reacted |
| Control |  | VP | E | P | P | G | No Bleeding | Reacted |

*: Air-dried pigment from the presscake
Control: Commercially available dry pigment from BASF, NBD 6156 D LD
Acid F.: Acid Fountain Solution
Alkaline F.: Alkaline Fountain Solution
Bleeding: Observed color in supernatant.
Reacted: Pigments stuck together on the bottom of a vial.

The treatment of the present invention increased compatibility in MEK, toluene and soy oil, and provided high resistance to the acidic fountain solution. Unfortunately the treatment did not significantly increase resistance to the alkaline fountain solution, because of the poor stability of polysiloxane in strong alkaline conditions.

Examples 28–30

Evaluation of Treated Copper Phthalocyanine Blue in Ink Applications

In these Examples, coated Copper Phthalocyanine Blue pigments are evaluated in heatset ink applications. Dimethyldichlorosilane was chosen as the coating material on the pigment in water. Table 28 shows the color quality as printed heatset inks on sheets of coated stock paper.

TABLE 28

Color Quality of Treated Pigment in Heatset Ink Formula

| | Example No. | | | |
|---|---|---|---|---|
| Coating Material (s) (wt. %) | 28 Silane (5 wt. %) | 29 Silane* (5 wt. %) | Untreated** | Control*** |
| L | 29.42 | 29.02 | 24.8 | 26.56 |
| a | −12.41 | −11.88 | −8.97 | −10.53 |
| b | −51.85 | −51.72 | −49.10 | 48.61 |
| Gloss at 60 degree | 48.7 | 54.3 | 61.7 | 58.4 |
| Density | 2.45 | 2.50 | 2.60 | 2.38 |

*: Heatset let-down varnish was modified from the original formula listed in the experimental section. Poly/PTFE Compound was eliminated from the formula and its content (5.2 wt. %) was shifted to Exoset HS-126-G (69.0 wt. %) and Exoset Q.S. 128 FF (12.0 wt. %).
**: Untreated pigment from the presscake by drying at 40 degrees C. overnight.
***: Control, Commercially available dry pigment from Sun Chemical, Sunfast Blue 15:3, 249–1282.

The inks that used the surface treated pigments generated transparent, green shaded and high density images in comparison with the reference inks, "Untreated" and "Control". Table 29 shows the Theological properties of the treated pigments in the heatset ink formulation.

TABLE 29

Rheological Properties of Heatset
Inks Consisted of Treated Pigment

| | Example No. | | | |
|---|---|---|---|---|
| Coating Material (s) (wt. %) | 28 Silane (5 wt. %) | 29 Silane* (5 wt. %) | Untreated** | Control*** |
| Viscosity (poise) | 258 | 314 | 317 | 232 |
| Yield Value (dyne/cm²) | 1939 | 1853 | 3332 | 2583 |
| S.F.**** | 7.5 | 5.9 | 10.5 | 11.1 |

*, , and *: See Table 28.
****: S.F., Shortness Factor = (Yield Value/ Viscosity)

*: Heatset let-down varnish was modified from the original formula listed in the experimental section. Poly/PTFE Compound was eliminated from the formula and its content (5.2 wt. %) was shifted to Exoset HS-126-G (69.0 wt. %) and Exoset Q.S. 128 FF (12.0 wt. %).
**: Untreated pigment from the presscake by drying at 40 degrees C. overnight.
***: Control, Commercially available dry pigment from Sun Chemical, Sunfast Blue 15:3, 249-1282.

The treated pigments generated good shortness factors compared with untreated pigments and the control, without any diluting agents, such as light mineral oils. It is very important to keep shortness factor low for high speed printing applications and the shortness factor closely relates to the nature of the pigment surface.

Examples 31–32

The purpose of this example was to demonstrate that coated pigments may be formed, converted to a presscake, and then used directly without forming a dry pigment intermediate. Further, this example demonstrates that pH adjustment of such a presscake may be used to alter or optimize the operability of the treated pigment presscake.

Copper phthalocyanine blue in presscake form from Magruder was converted to slurry form from the presscake by adding water with stirring. The pigment concentration in the slurry was controlled at 10% by weight. n-Octadecyltrichlorosilane was employed for the surface treatment of the pigment. It has a hydrophobic moiety as well as hydrophilic character after hydration by water.

The surface treating material, 10.7 wt. % to the pigment, was applied in water (10 wt. % pigment containing slurry) with mixing at 3000 rpm. The temperature of the slurry was kept at room temperature until addition of the surface treating material was finished. Then it was increased up to 70° C. and kept at the temperature for 30 minutes. After that it was cooled down near room temperature with mixing around 2000 rpm.

pH Adjustment of Treated Pigment

The surface treatment of the pigments with halosilanes in water generates strong acidic condition (pH 0.8 to 1.6) as well as high conductivity in the slurries. These values may be evaluated from the filtrates after the preparation of presscakes from the slurries. The pH adjustment was carried out in the following manner:

1. The presscake was redispersed in water in a ratio of 1/1.5 (presscake/water)by weight.
2. Diluted ammonium hydroxide in water was dropped in the slurry with stirring and its pH was checked by using a pH paper.
3. When the pH value reached around 7.00, the addition of the ammonium hydroxide in water was stopped.

After the filtration of the pH adjusted slurry and additional washing with water (same weight as the original presscake's), the pH value and conductivity of the filtrate was measured by using a pH meter and a conductivity meter.

Flushing Process

Flushing water from the presscake was carried out by adding and mixing a varnish as shown in Table 3 in two processing stages. The first stage was mixing the presscake with the varnish in a stainless steel container with a stirrer at room temperature. After phase separation from a emulsified condition was observed, the solid or heavy paste was separated from the liquid by filtration. The second stage was evaporation of water remaining in the solid or paste under reduced pressure at 40 degree C. with mixing at approximately 70 rpm. A Ross mixer described was used for the second stage flushing process.

The mixing ratio of the presscake involving the treated pigment to the varnish with anti-oxidant is calculated from 40 parts of treated pigment in dry weight involved in the presscake, 59 parts of the varnish and 1 part of 10 wt. % BHT in Aged Linseed Oil.

1. Procedure for Making Presscake and pH Adjustment of the Treated Pigment

Surface treated copper phthalocyanine blue was converted from slurry to presscake form by using a common filtration technique and the pigment concentration in the presscake was evaluated by drying it an oven at 110° C. for 3 days. The pH adjusted surface treated pigment was also evaluated by the same manner as described above after it was converted to presscake form. The results, including pH and conductivity of the filtrates, are shown in Table 30.

TABLE 30

Pigment Concentration in Presscake,
and pH and Conductivity of Filtrate

| Example No. | Pigment | Pigment Concentration (wt. %) | pH of Filtrate | Conductivity of Filtrate (mS/cm) |
|---|---|---|---|---|
| 31 | Treated (without) pH adjustment) | 33.0 | 1.54 | 25.4 |
| 32 | Treated (with pH adjustment) | 35.3 | 8.00 | 0.65 |
| | Untreated (without pH adjustment | 33.8 | 6.02 | 0.65 |

Concentration of the treated pigment in the presscake is quite similar to that of the untreated control. The concentration will be depended on the efficiency of the filtration process and time. The pH adjustment of the treated pigment was accomplished and resulted in a lowering the conductivity.

2. Grinding Gage Test of the Flushed Pigment

Grinding test of the flushed samples, which included the treated pigments, and a commercially available flush from Daicolor-Pope mixed with Capsule softening Vehicle NVFG-380, passed "0,0" by using N.P.I.R.I. Production Grindometer G-1 without any grinding process.

3. Evaluation of the Treated Pigment Quality Through Heatset Ink Formulation and Printing Heatset inks were formulated by using the flushed pigments mixing with a heatset let-down varnish in a ratio of 42/58 (flush/varnish) by weight. Table 31 shows the formulation of the let-down varnish.

TABLE 31

Formulation of Heatset Ink Let-Down Varnish

| Ingredients | Weight Percent |
| --- | --- |
| Exoset HS-126G (with M47 Oil)* | 69 |
| Exoset QS 128FF* | 12 |
| Capsule Softening Vehicle NVFG-380* | 5.2 |
| Exoset FF Varnish X-200-82A* | 12 |
| COVI-OX T-70 from Henkel Corp. | 1.8 |
| Total | 100.0 |

*They are from Walsh Manufacturing Company.

They were printed and evaluated with respect to their printed image quality as well as their Theological properties, by following the same procedures as those described in the section of "Evaluation of pigment in oil based ink".

Table 32 shows the properties of the treated pigments in heatset ink formula comparing with the flush from Daicolor-Pope.

TABLE 32

Properties of Surface Treated Copper Phthalocyanine Blue Pigment in Heatset Ink Formula made of Flush

| | Example No. | | |
| --- | --- | --- | --- |
| | 31 | 32 | |
| | Treated | Treated | Control from |
| | (without pH | (with pH | Daicolor-Pope |
| Pigment | adjustment) | adjustment) | in Flushed Form |
| L | 39.92 | 38.11 | 37.15 |
| a | −20.77 | −19.42 | −18.77 |
| b | −52.52 | −52.88 | −51.22 |
| Gloss at 60 degrees | 51.8 | 55.0 | 51.4 |
| Density | 2.16 | 2.22 | 2.18 |
| Vicosity (poise) | 465 | 440 | 613 |
| Yield Value (dyne/cm$^2$) | 3666 | 3371 | 9118 |
| Shortness Factor (Yield Value/Viscosity) | 7.9 | 7.7 | 14.9 |

The inks made from the surface treated pigments were superior to the control in quality as well as in rheological properties. Furthermore the ink made from the pH adjusted surface treated pigment exhibited better characteristics than the inks made from the non-pH adjusted one.

Examples 33–40

These examples demonstrate the correlation between pH and the hydrophilic/hydrophobic properties of the treated pigment particles, as can be observed from their stability in suspension in various solvents.

This pH dependence makes it possible to control the pigment surface hydrophilic/hydrophobic property by changing pH, making it possible to disperse the same treated pigment in high polar organic solvents as well as in water.

Pigment

Carbon black from Engineering Carbon, Panther 17V, in dry form, titanium dioxide from Nanophase in dry form, alkali blue from BASF, NB D6152, in presscake form, and pre-ground carbon black from Solution Dispersion Inc., AJACK BLACK 5021, in slurry form were used for these examples. Slurries were reconstituted by using the pigments in water, or a mixture of water and ethanol, and the pigment contents were controlled at 10 weight % for carbon black, 20 weight % for titanium dioxide, and 10 weight % for alkali blue.

Surface Treating Material

Methyltrichlorosilane and tetrachlorosilane were employed for the surface treatment of the pigments.

Surface Treatment Procedure

The surface treating material was applied on the pigment in the slurries as described above, with mixing by using a disperser from Premier Mill Corp., Laboratory Dispersator, Model 90, at 3000 rpm. The temperature of the slurry was kept at room temperature until addition of the surface treating material was finished. It then was increased up to 70° C. for a water based slurry. The temperature was controlled around 50° C. for a mixture of water and ethanol based slurries. Those slurries were mixed at 3000 rpm at the same temperature for 30 minutes. Subsequently, the slurries were cooled to near room temperature with mixing around 2000 rpm.

Preparation of Presscake

The slurry with the surface treated pigment was filtrated through a filter paper, and pH and conductivity of the filtrate were evaluated. The residue on the filter paper formed the presscake.

pH Adjustment of Treated Pigment pH adjustment was carried out by following procedure:

1) A presscake consisting of the surface treated pigment and water, about 50 grams, was re-dispersed in water in a ratio of 1/5 (presscake/water) by weight.

2) Diluted ammonium hydroxide in water was dropped in the slurry with stirring and its pH was checked by using a pH paper.

3) When the pH value reached around 10, the addition of the ammonium hydroxide was stopped. After filtration of the slurry and additional washing with deionized water (100 ml, twice of the washing), pH and conductivity of the filtrates were measures by using a pH meter and a conductivity meter.

Testing Procedure for Stability of Dispersed Pigment

Approximately 1 wt. % of pigment in presscake form except the pigment as control supplied in dry form, was dispersed in a solvent placed in a 20 ml glass vial. It was sonicated for 10 minutes. Solvents for the test were water, ethanol (EtOH) and methyl ethyl ketone (MEK). After the preparation, the dispersed pigment in the solvent was kept still on an experimental bench for 24 hours and then the stability of the dispersed pigment in the solvent was evaluated by observing the amount of settled pigment and the color of the supernatant. The degree of stability was measured in accordance with Table 1.

Particle Size Distribution Analysis

The procedure is described in the section of particle size distribution analysis in EXAMPLES. Panther 17 V (carbon black) and titanium dioxide were used as controls in dry form for comparison with the surface treated pigments in presscake form. Table 33 shows the stability of the dispersed pigments with/without surface treatment in several solvents and the pH dependency of their stability.

TABLE 33

Stability of Dispersed Pigment in Solvent and Its pH Dependency

| Ex. No. | Pigment | Pigment Content in Slurry | Silane and Concentration | pH | Conductivity mS/cm | H2O | EtOH | MEK |
|---|---|---|---|---|---|---|---|---|
| 33 | P17v* | 10 wt. % in water | $CH_3Si-Cl_3$ (20 wt. %) | 0.85 | 125.8 | E | VP | VP |
| 34 | P17v* | 10 wt. % in water | $CH_3Si-Cl_3$ (20 wt. %) | 7.75 | 0.210 | VP | E | E |
|  | P17v* Control | — | — | 6.26 | 0.339 | VP | E | VP |
| 35 | AJACK 5021** | 10 wt. % in water | $SiCl_4$ (6.5 wt. %) | 2.68 | 21.7 | E | VP | VP |
| 36 | AJACK 5021** | 10 wt. % in water | $SiCl_4$ (6.5 wt. %) | 7.94 | 0.229 | VP | E | E |
|  | AJACK 5021** Control | — | — | 4.28 | 3.15 | P | E | E |
| 37 | $TiO_2$ | 20 wt. % in water/EtOH (1/1 by wt) | $SiCl_4$ (10 wt. %) | 0.65 | 87.9 | E | P | VP |
| 38 | $TiO_2$ | 20 wt. % in water EtOH (1/1 by wt) | $SiCl_4$ (10 Wt. %) | 7.97 | 0.288 | E | E | G |
|  | $TiO_2$ Control | — | — | 2.21 | 1.71 | VP | E | VP |
| 39 | Alkali Blue | 10 wt. % in water | $SiCl_4$ (6.5 wt. %) | 1.01 | 89.2 | VP | E | P |
| 40 | Alkali Blue | 10 wt. % in water | $SiCl_4$ (6.5 wt. %) | 8.10 | 0.265 | E | E | E |
|  | Alkali Blue Control | — | — | 1.55 | 20.4 | VP | E | VP |

*Panther 17 V (Carbon Black)
**:AJACK BLACK 5021 (Carbon Black) Conductivity and pH value of a filtrate were measured for a control, after it went through entire process for the surface treatment except adding any surface treating agents and filtration of the slurry.

The two carbon black pigments treated in acidic and basic environment showed similar behavior in the three solvents, and were different in stability when compared to their controls. The pH adjustment for the treated titanium dioxide from acidic to basic condition increased dispersed stability in the all solvents. Its behavior in the solvents was totally different from its control except in ethanol. Alkali blue pigment also increased its stability in the solvents by the pH adjustment. Those results are different from the stability of its control in the solvents.

The pH control is one of the factors to control dispersed pigment stability in solvent, especially surface treated pigment and pH sensitive pigment. The surface character of titanium dioxide in acidic and basic conditions should be chemically different.

Another factor that affects the stability of pigment in a dispersed condition is its particle size distribution in a solvent. Ethanol was used as the solvent for evaluation of particle size distribution. Table 34 shows the results as well as the pH dependency for post-treatment.

TABLE 34

Particle Size Distribution of Pigment and its pH Dependency

| Example No. | Pigment* | pH | Median Diameter (Micrometer) | Standard Deviation (Micrometer) |
|---|---|---|---|---|
| 33 | P 17 V (Treated with $CH_3SiCl_3$) | 0.85 | 4.804 | 2.188 |
| 34 | P 17 V (Treated with $CH_3SiCl_3$) | 7.75 | 0.283 | 0.199 |
|  | P 17 V (Control) | 6.26 | 0.202 | 0.066 |
| 35 | AJACK 5021 (Treated with $SiCl_4$) | 2.68 | 0.252 | 0.632 |
| 36 | AJACK 5021 (Treated with $SiCl_4$) | 7.94 | N/A | N/A |
|  | AJACK 5021 (Control) | 4.28 | 0.110 | 0.194 |
| 37 | $TiO_2$ (Treated with $SiCl_4$) | 0.65 | 0.106 | 0.415 |
| 38 | $TiO_2$ (Treat with $SiCl_4$) | 7.96 | 0.104 | 0.025 |
|  | $TiO_2$ (Control) | 2.21 | 0.107 | 0.478 |
| 39 | Alkali Blue (Treated with $SiCl_4$) | 1.01 | N/A | N/A |

TABLE 34-continued

Particle Size Distribution of
Pigment and its pH Dependency

| Example No. | Pigment* | pH | Median Diameter (Micrometer) | Standard Deviation (Micrometer) |
|---|---|---|---|---|
| 40 | Alkali Blue (Treated with SiCl$_4$) | 8.10 | N/A | N/A |
| | Alkali Blue (Control) | 1.55 | N/A | N/A |

*: Explanations for pigments follows the column for pigment in Table 1.
N/A: HORIBA Particle Analyzer could not detect the pigments. Their particle size will be less than 0.04 micrometer.

The control of Panther 17V carbon black showed a smaller and narrower particle distribution than the treated carbon black, because the quantity of methyltrichlorosilane (20 wt. %) for the coating was too large. Generally, the surface treated pigments demonstrated particle sizes and particle distributions that were smaller and narrower than their controls. These results directly relate to the stability of the dispersed pigments in ethanol.

What is claimed is:

1. A method for preparing surface treated pigment particles, said method consisting of (1) contacting a dispersion of pigment particles with a surface treating agent selected from the group consisting of halosilanes and organohalosilanes, at a temperature from about 0 to about 40° C. while maintaining the particles in dispersion with high shear stirring, (2) heating the resulting dispersion to a temperature from about 40 to about 70° C. while maintaining high shear stirring, (3) allowing the dispersion to cool to a temperature from about 15 to about 30° C., and (4) recovering the resulting surface treated particles.

2. The method of claim 1, wherein the surface treated particles are recovered as a presscake.

3. The method of claim 1, wherein the surface treated particles are recovered as dry particles.

4. The method of claim 1, wherein the surface treating agent is added to the dispersion in an amount less than about 15% by weight of the pigment particles.

5. The method of claim 1, wherein the pigment particles are organic pigment particles.

6. The method of claim 2, wherein the pigment particles are organic pigment particles.

7. The method of claim 3, wherein the pigment particles are organic pigment particles.

8. The method of claim 1, wherein the pigment particles are inorganic pigment particles.

9. The method of claim 2, wherein the pigment particles are inorganic pigment particles.

10. The method of claim 3, wherein the pigment particles are inorganic pigment particles.

11. The method of claim 1, wherein the pigment particles are carbon black.

12. The method of claim 2, wherein the pigment particles are carbon black.

13. The method of claim 3, wherein the pigment particles are carbon black.

14. A method for preparing a pigment concentrate, consisting of (1) contacting a dispersion of pigment particles with a surface treating agent selected from the group consisting of halosilanes and organohalosilanes, at a temperature from about 0 to about 40° C. while maintaining the particles in dispersion with high shear stirring, (2) heating the resulting dispersion to a temperature from about 40 to about 70° C. while maintaining high shear stirring, (3) allowing the dispersion to cool to a temperature from about 15 to about 30° C., (4) recovering the resulting surface treated particles as a presscake and (5) adding an organic vehicle to the resulting presscake.

15. A method for preparing a pigment concentrate, consisting of (1) contacting a dispersion of pigment particles with a surface treating agent selected from the group consisting of halosilanes and organohalosilanes, at a temperature from about 0 to about 40° C. while maintaining the particles in dispersion with high shear stirring, (2) heating the resulting dispersion to a temperature from about 40 to about 70° C. while maintaining high shear stirring, (3) allowing the dispersion to cool to a temperature from about 15 to about 30° C., (4) recovering the resulting surface treated particles as dry particles and (5) adding an organic vehicle to the resulting surface treated dry particles.

16. A method for preparing a pigment dispersion, consisting of (1) contacting a dispersion of pigment particles with a surface treating agent selected from the group consisting of halosilanes and organohalosilanes, at a temperature from about 0 to about 40° C. while maintaining the particles in dispersion with high shear stirring, (2) heating the resulting dispersion to a temperature from about 40 to about 70° C. while maintaining high shear stirring, (3) allowing the dispersion to cool to a temperature from about 15 to about 30° C., (4) recovering the resulting surface treated particles as a presscake, (5) adding an organic vehicle to the resulting presscake to form a pigment concentrate, and (6) dispersing the concentrate with one or more solvents selected from the group consisting of ketones, alcohols, alkanols, water, ethers, glycols, low polar organic solvents and non-polar organic solvents.

17. A method for preparing a pigment dispersion, consisting of (1) contacting a dispersion of pigment particles with a surface treating agent selected from the group consisting of halosilanes and organohalosilanes, at a temperature from about 0 to about 40° C. while maintaining the particles in dispersion with high shear stirring, (2) heating the resulting dispersion to a temperature from about 40 to about 70° C. while maintaining high shear stirring, (3) allowing the dispersion to cool to a temperature from about 15 to about 30° C., (4) recovering the resulting surface treated particles as dry particles (5) adding an organic vehicle to the resulting surface treated dry particles to form a pigment concentrate, and (6) dispersing the concentrate with one or more solvents selected from the group consisting of ketones, alcohols, alkanols, water, ethers, glycols, low polar organic solvents and non-polar organic solvents.

* * * * *